United States Patent
Veilleux

(10) Patent No.: US 8,082,952 B2
(45) Date of Patent: Dec. 27, 2011

(54) PIEZOELECTRIC BENDING ELEMENT ACTUATOR FOR SERVO VALVE

(75) Inventor: Leo J. Veilleux, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 684 days.

(21) Appl. No.: 12/196,305

(22) Filed: Aug. 22, 2008

(65) Prior Publication Data
US 2010/0044605 A1 Feb. 25, 2010

(51) Int. Cl.
*F16K 31/00* (2006.01)

(52) U.S. Cl. ......... 137/625.64; 137/625.68; 137/625.69; 251/129.06

(58) Field of Classification Search ............. 251/129.06; 137/625.64, 625.68, 625.69
See application file for complete search history.

(56) References Cited

U.S. PATENT DOCUMENTS

| | | | |
|---|---|---|---|
| 3,095,906 A * | 7/1963 | Kolm, Jr. .................. | 137/625.62 |
| 3,152,612 A * | 10/1964 | Avery ........................ | 137/625.4 |
| 3,524,474 A * | 8/1970 | McCormick ............. | 137/625.64 |
| 3,612,103 A * | 10/1971 | Waddington ............. | 137/625.64 |
| 4,596,360 A | 6/1986 | Cohen | |
| 4,825,894 A * | 5/1989 | Cummins ................. | 251/129.06 |
| 4,959,581 A | 9/1990 | Dantlgraber | |
| 5,085,125 A * | 2/1992 | Emo et al. ................. | 251/129.06 |
| 5,148,735 A * | 9/1992 | Veletovac ................. | 137/625.64 |
| 5,709,245 A * | 1/1998 | Miller ....................... | 137/625.64 |
| 5,996,623 A * | 12/1999 | Omberg .................... | 137/625.69 |
| 6,076,555 A * | 6/2000 | Hettinger ................. | 137/625.69 |
| 6,401,446 B1 | 6/2002 | Gibbons | |
| 6,526,864 B2 * | 3/2003 | Lindler et al. ........... | 251/129.06 |
| 6,552,473 B2 | 4/2003 | Montuschi | |
| 6,715,731 B1 * | 4/2004 | Post et al. ................ | 251/129.06 |
| 6,926,490 B2 | 8/2005 | McAuliffe | |
| 6,933,660 B2 | 8/2005 | Maushard | |
| 6,945,276 B2 | 9/2005 | Dorfler | |
| 7,040,349 B2 | 5/2006 | Moler | |
| 7,097,484 B2 | 8/2006 | Schurz | |
| 7,159,614 B2 | 1/2007 | Tiziani | |
| 7,322,376 B2 | 1/2008 | Frisch | |
| 7,360,750 B2 | 4/2008 | Yano | |
| 2006/0218928 A1 | 10/2006 | Spickard | |

FOREIGN PATENT DOCUMENTS

| | | |
|---|---|---|
| DE | 1226843 | 10/1966 |
| DE | 3608550 | 9/1987 |
| DE | 19931990 | 1/2001 |
| GB | 2443046 | 4/2008 |
| WO | 99/61827 | 12/1999 |

OTHER PUBLICATIONS

Piezo Systems, Inc.—Catalog #7B, 2007, p. 53, "Standard 4-Layer Elements". See also www.piezo.com.

* cited by examiner

*Primary Examiner* — John Bastianelli
(74) *Attorney, Agent, or Firm* — Carlson, Gaskey & Olds, PC

(57) ABSTRACT

A valve assembly includes a valve housing. A valve body is movable within the housing. The valve body has a land to selectively block or communicate a supply port to an outlet. A piezoelectric bending element actuator moves the valve body to selectively communicate the supply port to the outlet port.

15 Claims, 2 Drawing Sheets

PIEZOELECTRIC BENDING ELEMENT ACTUATOR FOR SERVO VALVE

BACKGROUND OF THE INVENTION

This application relates to a servo valve wherein a piezoelectric bending element moves a valve body.

Fluid valves are utilized in a number of applications. A fluid valve may be utilized to control the flow of a pressurized fluid to various elements, such as to supply hydraulic fluid to power various devices.

Very complex valves are known, and can be relatively expensive. One type of valve is a dog servo valve. In a dog servo valve a valve body is movable between extreme positions within a housing. A source of pressurized fluid is communicated to ports that selectively communicate with downstream uses of the fluid. The position of the valve controls whether fluid is communicated, and how much may be communicated.

One well known application of a dog valve communicates fluid to alternative ports. Known dog valves typically include an actuator at a central location for moving the valve between extreme positions in the housing. These actuators have utilized motors, such as stepper motors, and are expensive.

Piezoelectric elements are known to move valves; however, they have not been utilized at a central location in a valve body.

SUMMARY OF THE INVENTION AND ADVANTAGES

A valve assembly includes a valve housing. A valve body is movable within the housing. The valve body has a land to selectively communicate a chamber in the valve housing to a supply port. An outlet port communicates the chamber to a location outwardly of the housing. A piezoelectric bending element actuator moves the valve body to selectively communicate the supply port to the outlet port.

In disclosed embodiments, the piezoelectric bending element is positioned between two piloting nozzles. As the piezoelectric bending element moves, it restricts one of the piloting nozzles. Pressurized hydraulic fluid associated with the piloting nozzles will tend to center the valve body relative to the piezoelectric bending element, and thus move the vale body to a desired position.

These and other features of the present invention can be best understood from the following specification and drawings, the following of which is a brief description.

DETAILED DESCRIPTION OF THE PREFERRED EMBODIMENT

Figure 1:
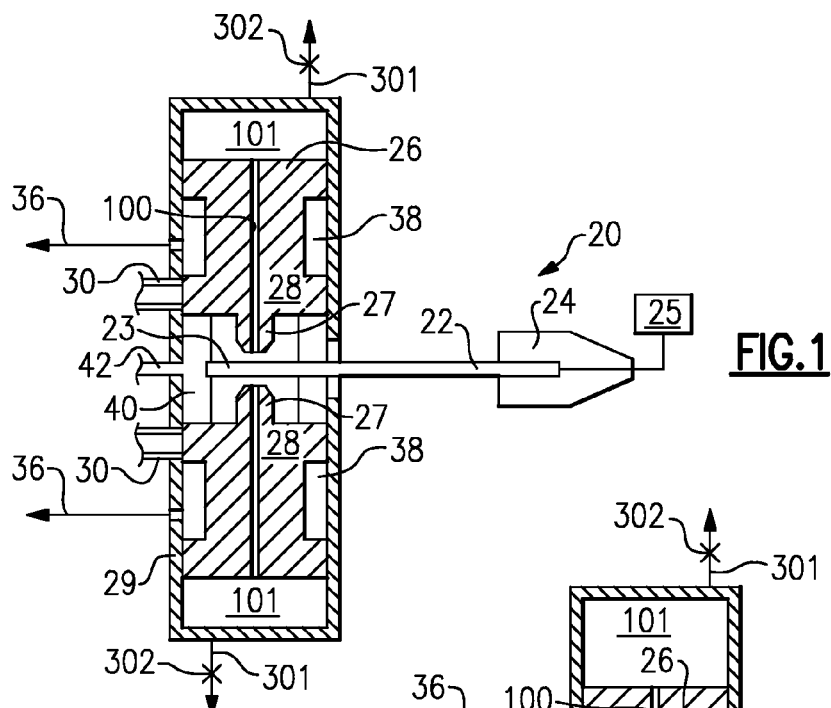
FIG. 1 shows a valve arrangement in a neutral position.

A valve arrangement 20 includes a piezoelectric bending actuator 22 having a mount 24. The mount 24 will mount the actuator 22 in an appropriate manner. A control 25 communicates with the actuator 22, and can cause a remote end 23 of the actuator to bend vertically upwardly or downwardly from the position illustrated in FIG. 1. Such piezoelectric bending actuators are known, but have not been utilized to move a valve body. As shown, a valve body 26 has piloting nozzles 27 closely spaced about the remote end 23. The valve body 26 is movable within a valve housing 29. A seal (not illustrated) of some sort seals the location where the actuator 22 enters the valve housing 29.

The valve body 26 has lands 28 and defines chambers 38 between the lands and an end of the valve body. As shown in FIG. 1, a fluid, which may be pressurized hydraulic fluid, is supplied to port 42. Port 42 communicates with chamber 40. Ports 30, which are outlet ports, are blocked by the lands 28 in the FIG. 1 position. Ports 30 lead to a use for the pressurized fluid such as a control. A return line 36 returns fluid to a sump. Also, return lines 301 extend from the chambers 101 through a restriction 302 to a sump.

A passage 100 extends through each land 28 to pressurized chambers 101 on opposed sides of the valve body 26. Piloting nozzles 27 are formed at an end adjacent to the piezoelectric bending actuator 22, and its end 23.

Figure 2A:
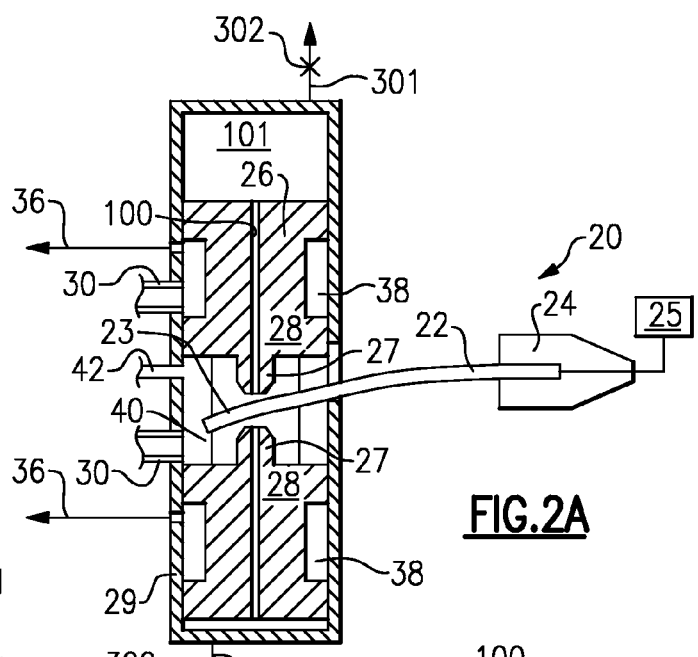
FIG. 2A shows the valve arrangement having been actuated to communicate fluid to a first port.

When it is desired to communicate the supply port 42 to one of the ports 30, then the control 25 actuates the piezoelectric bending element such that its end 23 bends. As shown in FIG. 2A, the end is moved downwardly to drive the valve body downwardly.

Figure 2B:
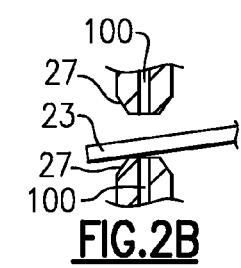
FIG. 2B shows a detail of the piezoelectric bending element.
Figure 2C:
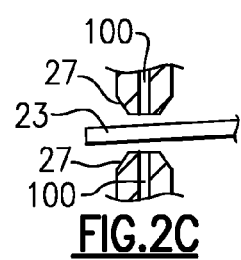
FIG. 2C shows an adjustment that will occur after the FIG. 2B position.

As can be appreciated from FIG. 2B, when the end 23 first moves downwardly, it is adjacent the lower piloting nozzle 27. The pressure moving through that piloting nozzle 27 to the chamber 101 will be reduced relative to the pressure reaching the opposed chamber 101 through its piloting nozzle 27. Then, the valve will adjust downwardly due to the imbalance in pressure. FIG. 2C shows the valve body after such an adjustment. In this manner, the valve body 26 is moved from the FIG. 1 position to the FIG. 2A position.

Figure 3:
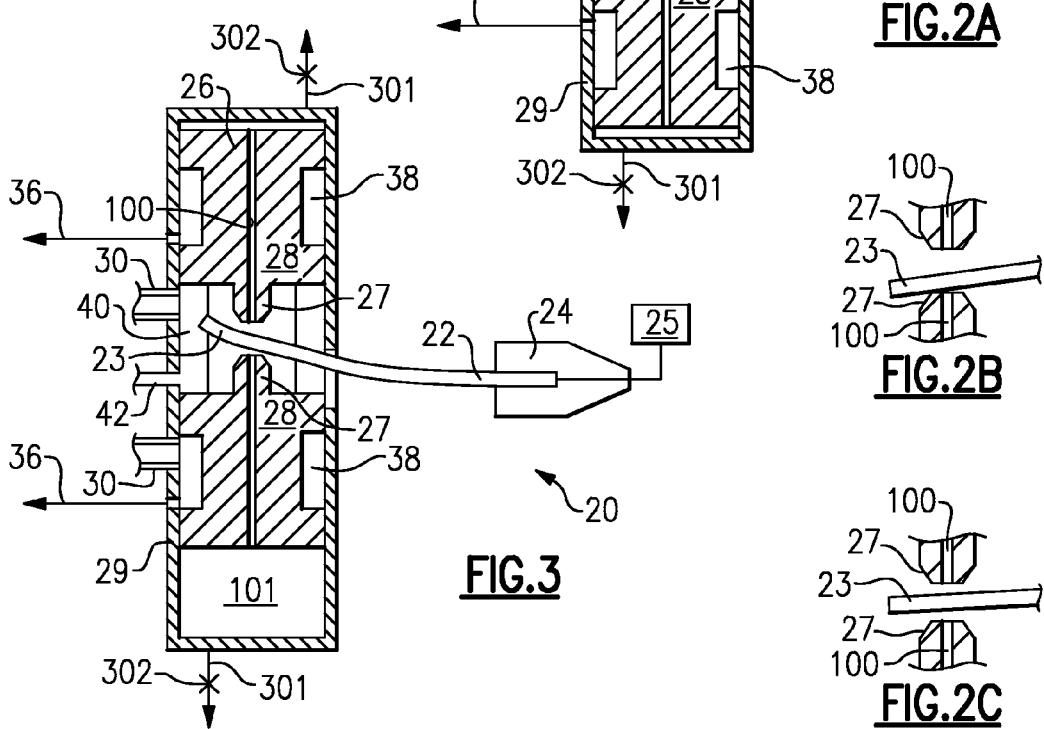
FIG. 3 shows the valve arrangement having been actuated to move or communicate fluid to a second port.

In the FIG. 2A position, the upper port 30 communicates with chamber 38, and then to the return line 36. The piezoelectric bending element 22 is driven to the reverse position as shown in FIG. 3, should it be desired to communicate the other return line to the port 30, and the upper outlet port 30 to supply port 42.

Figure 4:
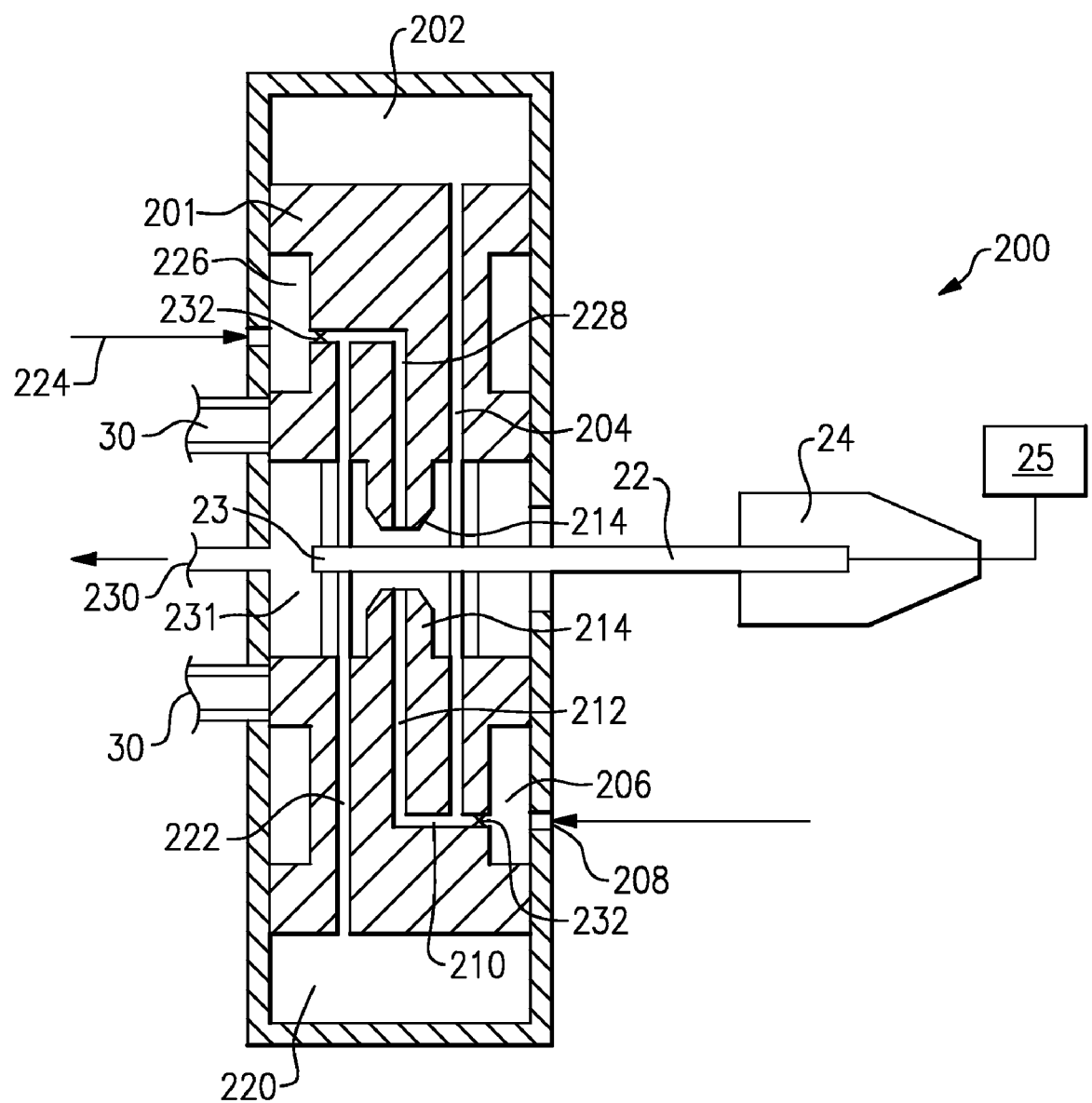
FIG. 4 shows another embodiment valve.

FIG. 4 shows another embodiment 200 wherein a first end chamber 202 receives a pressurized fluid through a passage 204 extending through the valve spool 201. The passage 204 communicates with a remote chamber 206 receiving a pressurized or supply pressure through a connection 208. A tap 210 extends to a passage 212 and to a piloting nozzle 214.

An opposed piloting nozzle 214 receives its pressurized fluid from a tap 228 receiving pressurized fluid from a chamber 226 having its own supply port 224. The chamber 226 also communicates pressurized fluid through a passage 222 to an opposed chamber 220.

The outlet ports 30 are similar to the first embodiment, and a port 230 returns to a return line or sump from a chamber 231. A restriction 232 is placed upstream of the lines 204, 222, 212 and 228 to modulate the pressure reaching the chambers 202.

Similar to the prior embodiment, as the end 23 of the piezoelectric bending element 22 approaches one of the piloting nozzles 214, it will restrict flow. As an example, if the end 23 bends upwardly from the position of FIG. 4, it restricts the upper piloting nozzle 214. This will increase the pressurized fluid passing through the passage 222 to the chamber 220, and cause the valve body 201 to adjust vertically upwardly, communicating upper port 30 to the return port 230, and communicating the lower outlet port 30 to the lower supply line 208. Again, more in the opposed direction will be achieved by downward bending.

The present invention thus provides a relatively inexpensive and precise way to control a valve body position.

One known piezo actuator element that may be utilized in this invention whether it be a standard four-layered element such as is available from Piezo Systems, Inc. of Cambridge Mass. Information can be obtained at www.piezo.com.

While the end 23 is disclosed as being at a "central portion" of the valve body, it need not be centered. Simply, the description simply means it is at a position of the valve body intermediate its extreme ends.

While one valve application has been disclosed, this application would extend to other valve applications. As an example, any valve which utilizes an actuator to move a valve body between extreme positions within a housing could benefit from this invention.

While an embodiment has been disclosed, a worker of ordinary skill in this art would recognize that certain modifications would come within the scope of this invention. For that reason, the following claims should be studied to determine the true scope and content of this invention.

What is claimed is:

1. A valve assembly including:
   a valve housing;
   a valve body movable within said housing, said valve body having a land to selectively communicate a supply port in said valve housing to an outlet port; and
   a piezoelectric bending element for moving said valve body to selectively communicate said supply port to said outlet port, and said piezoelectric bending element moving said valve body by restricting or opening flow through at least one piloting nozzle in the valve body.

2. The valve assembly as set forth in claim 1, wherein said piezoelectric bending element is mounted at a central location on said valve body.

3. A valve assembly including:
   a valve housing;
   a valve body movable within said housing, said valve body having a land to selectively communicate a supply port in said valve housing to an outlet port;
   a piezoelectric bending element for moving said valve body to selectively communicate said supply port to said outlet port;
   said valve body includes a pair of body portions each having a piloting nozzle with said piloting nozzles positioned on opposed sides of said piezoelectric bending element, a pair of said lands, with each land associated with an outlet port.

4. The valve assembly as set forth in claim 3, wherein said piezoelectric bending element has a remote end that bends toward one of the piloting nozzles to restrict said one of said piloting nozzles, and hydraulic forces within said valve housing then adjust said valve body to move in the direction that said piezoelectric bending element has bent.

5. The valve assembly as set forth in claim 4, wherein a high pressure supply fluid moves through the piloting nozzles, which are defined in said valve body, to a remote chamber, and said piezoelectric bending element restricting one of said piloting nozzles when it has been bent by said actuator.

6. The valve assembly as set forth in claim 1, wherein there are a pair of said outlet ports, a pair of return ports, and said piezoelectric bending element moving said valve body to selectively control the communication of said outlet ports to respective ones of said return lines, and a chamber communicating with the supply port.

7. The valve assembly as set forth in claim 1, wherein there are a pair of said outlet ports, a pair of supply ports, and said piezoelectric bending element moving said valve body to selectively control the communication of said outlet ports to respective ones of said supply ports, and a chamber communicating with a return port.

8. The valve assembly as set forth in claim 1, wherein the piezoelectric bending element is a multi-layer bending element.

9. A valve assembly including:
   a valve housing;
   a valve body movable within said valve housing, said valve body having a pair of lands to selectively communicate a supply port in said valve housing to a pair of outlet ports;
   a piezoelectric bending element for moving said valve body to selectively communicate said supply port to one of said outlet ports, and an actuator causing said piezoelectric bending element to bend;
   said piezoelectric bending element mounted at a central location on said valve body;
   said valve body includes a pair of body portions each having a piloting nozzle, with said piloting nozzles positioned on opposed sides of said piezoelectric bending element, said piezoelectric bending element having a remote end that bends toward one of the piloting nozzles to restrict said one of said piloting nozzles, and hydraulic forces within said valve housing then adjusting said valve body to move in the direction that said piezoelectric bending element has bent; and
   a supply fluid moving through the piloting nozzles to a remote chamber, and said piezoelectric bending element restricting one of said piloting nozzles when it has been bent by said actuator.

10. The valve assembly as set forth in claim 9, wherein said piezoelectric bending element has a control remote from said remote end.

11. The valve assembly as set forth in claim 9, wherein the piezoelectric bending element is a multi-layer bending element.

12. The valve assembly as set forth in claim 9, wherein there are a pair of supply ports, and said actuator moving said valve body to selectively control the communication of said outlet ports to respective ones of said supply lines, and a chamber communicating with a return port.

13. The valve assembly as set forth in claim 12, wherein said return port communicates with a central chamber, and said remote end of said piezoelectric bending element extending its said central chamber.

14. The valve assembly as set forth in claim 9, wherein there are a pair of return ports, and said actuator moving said valve body to selectively control the communication of said outlet ports to respective ones of said return lines, and a chamber communicating with the supply port.

15. The valve assembly as set forth in claim 14, wherein said supply port communicates with a central chamber, and said remote end of said piezoelectric bending element extending into said central chamber.

* * * * *